United States Patent [19]

Tice

[11] 4,372,222
[45] Feb. 8, 1983

[54] SCREW AND FLOATING DRIVE NUT ASSEMBLY

[75] Inventor: Larry E. Tice, Harrisburg, N.C.

[73] Assignee: Colt Industries Operating Corp., West Hartford, Conn.

[21] Appl. No.: 194,459

[22] Filed: Oct. 6, 1980

[51] Int. Cl.³ .......................... A47B 13/00; F16H 1/18
[52] U.S. Cl. .................................. 108/137; 74/89.15; 74/424.8 R; 108/20; 248/657; 269/60
[58] Field of Search .......................... 108/137, 147, 20; 248/657, 656, 178; 269/60; 74/424.8 R, 89.15

[56] References Cited

U.S. PATENT DOCUMENTS

| 2,571,552 | 10/1951 | Elderkin et al. | 74/424.8 R X |
| 3,347,116 | 10/1967 | Anderson et al. | 74/424.8 R X |
| 3,495,519 | 2/1970 | Alfsen et al. | 108/137 |
| 4,193,317 | 3/1980 | Oono et al. | 108/137 X |
| 4,274,294 | 6/1981 | Siryj et al. | 74/89.15 |
| 4,302,981 | 12/1981 | Wayman | 74/89.15 |

Primary Examiner—William E. Lyddane
Attorney, Agent, or Firm—Radford W. Luther; Richard A. Dornon

[57] ABSTRACT

A precision drive assembly for the table (b 10) of a machine tool incorporates a screw (12) and floating ball nut (14). The nut is supported by a pair of rods (18,20) which, in turn, are connected to a bracket (26) mounted on the table. The nut is prevented from rotating about its axis by a torque arm (38) extending from the side of the nut and anchored to a bracket (52) attached to the table. Because of this arrangement the nut may move sideways or vertically without substantially altering its linear position.

4 Claims, 3 Drawing Figures

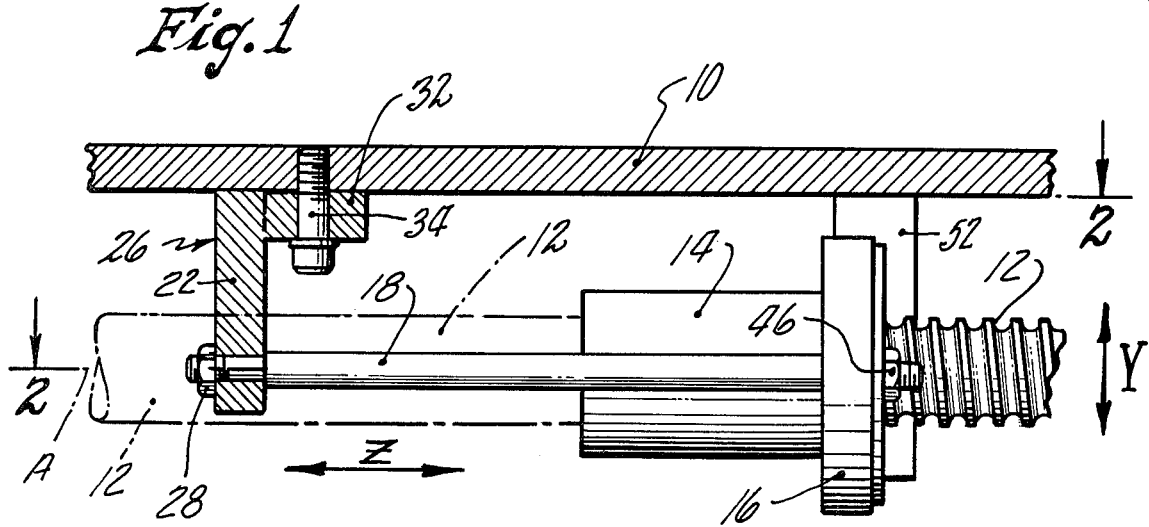
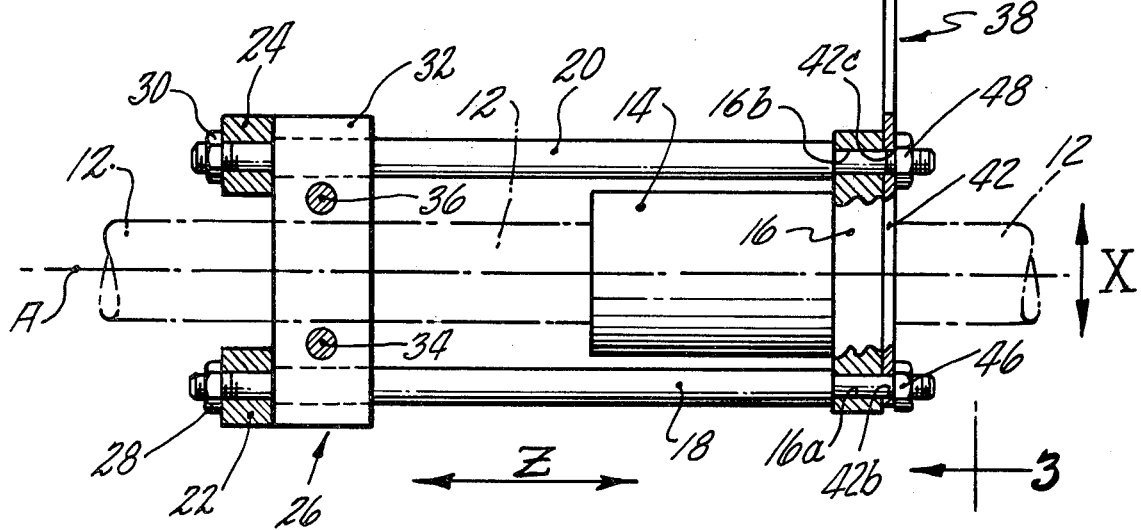

SCREW AND FLOATING DRIVE NUT ASSEMBLY

TECHNICAL FIELD

This invention relates to precision screw assemblies which are employed to position work tables or the like.

BACKGROUND ART

Conventional precision screw assemblies mandate accurate alignment of the nut and screw axes throughout the range of movement. The tables or other objects driven by the screw assembly must also be mounted so as to be accurately guided in their axial or linear motions. Also, deviations in the axis of the screw must be minute.

DISCLOSURE OF INVENTION

The invention provides a precision screw assembly incorporating a floating nut adapted to accommodate minor inconformities in the screw and deviations in axial table motion.

Succinctly stated, the nut is connected to at least one rod which extends from a bracket attached to the table whereby the nut can move vertically or sidewise. Any twisting or rotation of the nut about its axis is prevented by an arm attached to a side of the nut having its opposite end attached to another bracket on the table. The manner of attachment to the second mentioned bracket is such that sidewise and vertical nut movements are untrammelled.

A precision screw assembly according to the invention is advantageous because it does not mandate precise dimensions, perpendicularities and parallelisms. Any floating of the nut in an assembly of the invention will affect the linear position thereof in a minimal and insignificant way.

Accordingly, it is a primary object of the invention to provide a precision screw assembly having a floating nut which permits wider tolerances.

This and other objects and advantages of the invention will become more readily apparent from the following detailed description, when taken in conjunction with the accompanying drawings, in which:

BRIEF DESCRIPTION OF DRAWINGS

FIG. 1 is a side elevational view of a precision screw assembly of the invention.

FIG. 2 is a top plan view of the precision screw assembly of FIG. 1, taken substantially along the line 2—2 of FIG. 1.

BEST MODE OF CARRYING OUT THE INVENTION

Figure 3:
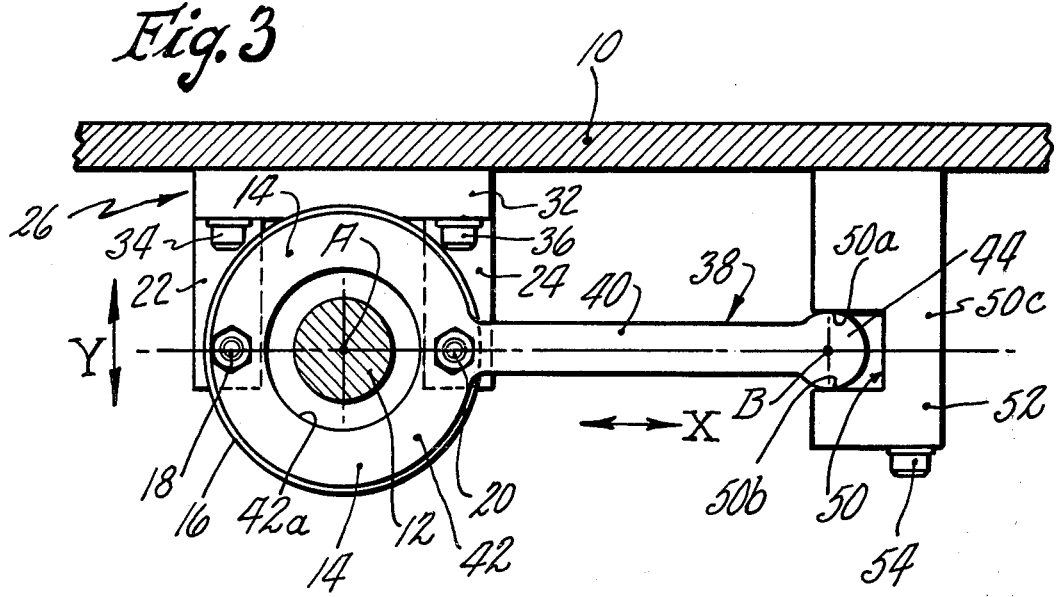
FIG. 3 is a rear elevational view of the precision screw assembly, taken substantially along the line 3—3 of FIG. 2.

Referring to the drawings, there is shown a precision screw assembly according to the invention. The depicted screw assembly is adapted to drive a table 10 (FIGS. 1 and 3) forwardly and rearwardly in the Z directions indicated by the double-headed arrow. The table, which may be guided by suitable ways (not shown), could be one of the tables of a machine tool, such as a machining center, a chucker or an electrical discharge machine.

The precision screw assembly includes the usual screw 12 which is in threaded engagement with a conventional ball nut 14 which includes a flange 16. Movements of the ball nut 14, produced by screw rotation, are preferably transmitted to the table 10 by means of a pair of rods 18 and 20. The rods 18 and 20 project through bores 16a and 16b in opposite sides of the flange 16 and extend forwardly therefrom parallel to the ball nut 14 and screw 12. The forward ends of the rods 18 and 20 are threaded and are respectively secured to the depending legs 22 and 24 of an L-shaped first bracket 26 by nuts 28 and 30. The upper or horizontal leg 32 of the bracket 26 is attached to the underside of the table 10 by bolts 34 and 36. As best seen in FIGS. 2 and 3, the legs 22 and 24 straddle the screw as do the rods 18 and 20.

A Torque arm 38 is provided to prevent the nut 14 from rotating about its axis in either a clockwise or counterclockwise sense. Essentially the torque arm 38 is preferably constituted by an arm 40 with an annular disc shaped based 42 and a rounded extremity 44. The screw is received within the centrally disposed opening 42a in the base 42; and the right threaded ends of the rods 18 and 20 are received in holes 42b and 42c in the base which are respectively aligned with the bores 16a and 16b in the flange 16. Nuts 46 and 48 on the respective rear threaded ends of the rods 18 and 20 serve to connect the base 42 to flange 16 such that the forward face of the base 42 abuts the rear face of the flange 16. The nuts 46 and 48, of course, also function to secure the ball nut 14 to the rods 18 and 20. Hence, it will be appreciated that the ball nut 14, rods 18 and 20 and torque arm 38 move forwardly and rearwardly in unison and define an integral structure.

The rounded extremity 44 of the horizontally extending torque arm 38 is anchored within a second slot 50 of a bracket 52, the bracket 52 being mounted upon the underside of the table 10 by a bolt 54 and constituting a part thereof. The slot 50 is vertically dimensioned whereby a sliding fit is occasioned between the rounded extremity and the upper and lower walls 50a and 50b of the slot. The vertical wall 50c of the slot is laterally spaced from the rounded extremity a distance sufficient to insure that no contact will be engendered therebetween. It will be noted that the depicted mounting of the rounded extremity 44 in the slot 50 permits sidewise or axial movement in the X directions of the torque arm 38 and also allows for pivoting of the torque arm about an axis B (FIGS. 2 and 3) passing through the rounded extremity 44. Pivoting of the Torque arm about the axis B will, of course, permit vertical movement of the ball nut 14 in the Y directions. It should, however, be evident that the torque arm 44 will positively prevent any rotation of the ball nut 14 about its axis A because of the engagement between the walls 50a and 50b and the rounded extremity 44. Hence, the illustrated mounting permits the ball nut 14 to float sidewise and vertically in a generally vertical plane with consequential flexing of the rods 18 and 20.

Floating of the nut 14 in the directions indicated by the arrows X and Y, (as could be beget, for example, by major deviations in the screw axis) will cause flexure of the rods 18 and 20. However, the axial or linear position of the ball nut 14 with respect to the mounting bracket 26 will remain substantially unaffected. Moreover proper design of the rods 18 and 20 will result in only minimal forces being exerted upon the screw 12 by the ball nut 14. For example, assume that the nut is deflected such that its axis A is 0.03 inches from where it would normally be if the rods were unflexed. If the rods are 6 inches long, have a modulus of elasticity of $30 \times 10^6$ and a diameter of 0.375 inches, the change in the linear distance between the bracket 26 and the ball nut is only 0.000075 inches. Furthermore, the force engendered is only about 25 lbs. Forces may easily be computed utilizing a convential cantilever beam analysis. If desired, universal connections may be provided at the forward, rear or both ends of the rods to eliminate any forces caused by floating of the nut.

Obviously, many modifications and variations are possible in light of the above teachings without departing from the scope or spirit of the invention as defined in the appended claims:

I claim:

1. In a precision screw assembly adapted to position table of the type having a screw and a ball nut in threaded engagement with the screw, the improvement comprising:
    a rod connected to and extending from the ball nut in parallel relationship to the screw;
    a first bracket mounted on the table and fixedly connected to the rod such that motion of the ball nut is transmitted to the table;
    an arm connected to and radially extending from the nut;
    a second bracket mounted on the table; and
    the arm being anchored to the second bracket for pivoting movement with respect to the bracket about an axis generally parallel to the axis of the screw and for axial movement with respect to the second mentioned bracket such that the nut is prevented from rotating about its axis but is free to move sidewise and vertically.

2. The improvement of claim 1, wherein the second bracket has a slot therein and wherein the arm has a rounded extremity received within the slot to thereby anchor the arm to the second bracket such that the arm may move axially and pivot about the rounded extremity.

3. The improvement of claim 2, further including:
    another rod connected to and extending from the ball nut in parallel relationship to the screw, and fixedly connected to the first bracket.

4. The improvement of claim 3, wherein the ball nut comprises a flange and wherein the rods are respectively connected to opposite sides of the flange.

* * * * *